US006796354B2

(12) United States Patent
Nauta et al.

(10) Patent No.: US 6,796,354 B2
(45) Date of Patent: Sep. 28, 2004

(54) SPLICER FOR SPLICING STRIPS OF CORDS EMBEDDED IN RUBBER MATERIAL TO EACH OTHER

(75) Inventors: Klaas Nauta, Epe (NL); Theodorus Gijsbertus Gerardus Teunissen, Oosterhout (NL)

(73) Assignee: VMI Epe Holland B.V., Epe (NL)

( * ) Notice: Subject to any disclaimer, the term of this patent is extended or adjusted under 35 U.S.C. 154(b) by 0 days.

(21) Appl. No.: 10/298,260

(22) Filed: Nov. 15, 2002

(65) Prior Publication Data
US 2003/0089459 A1 May 15, 2003

Related U.S. Application Data

(63) Continuation of application No. PCT/NL01/00385, filed on May 21, 2001.

(51) Int. Cl.[7] .............................................. B32B 31/10
(52) U.S. Cl. .................... 156/558; 156/157; 156/304.1; 156/264; 156/502
(58) Field of Search ................. 156/157, 159, 156/502, 304.1, 304.6, 264, 364, 507, 558

(56) References Cited

U.S. PATENT DOCUMENTS

| 2,850,277 A | | 9/1958 | Clark ......................... 271/2.6 |
| 3,859,152 A | * | 1/1975 | Brey et al. ..................... 156/88 |
| 3,935,056 A | | 1/1976 | Koyama et al. ............. 156/507 |
| 4,407,439 A | | 10/1983 | Buss ............................ 226/20 |
| 4,832,780 A | | 5/1989 | Ishijo et al. ................. 156/360 |
| 5,131,971 A | * | 7/1992 | Elia et al. .................... 156/512 |
| 5,145,542 A | * | 9/1992 | Tanaka et al. ............... 156/159 |
| 5,514,233 A | * | 5/1996 | Miyamoto .................... 156/64 |
| 6,280,556 B1 | * | 8/2001 | Okada et al. ................ 156/264 |

FOREIGN PATENT DOCUMENTS

DE 19707367 6/1998

* cited by examiner

Primary Examiner—Mark A. Osele
(74) Attorney, Agent, or Firm—Ladas & Parry

(57) ABSTRACT

Splicer (1) for splicing to each other strips (30) of cords embedded in rubber material. The device comprises a supply transport device (2) for supplying strips in a supply direction. A splicing unit (6) splices strips to each other, and comprises a splicing table (7) and a splicing machine (8) placed over the splicing table. The supply transport device supplies strips to the splicing unit. A discharge transport device (11) discharges strips spliced to each other. A first (4) and a second (5) transport unit that are in line with each other are provided. The first transport unit (4) supplies strips to the second transport unit (5), in which the second unit supplies strips to the splicing unit and has an inlet end and an outlet end. The outlet end of the second transport unit and the splicing table are laterally, that means transverse to the transport direction, movable with respect to each other. Preferably the splicing machine determines a splice line (12), in which a target position is formed by the middle of the splice line. A computer is provided having a file in which a target position has been included. A comparer compares a position signal generated by a sensor (13) and fed into the computer, with the target position and issues a control signal for controlling the relative lateral position of the splicing table and the second transport unit.

22 Claims, 3 Drawing Sheets

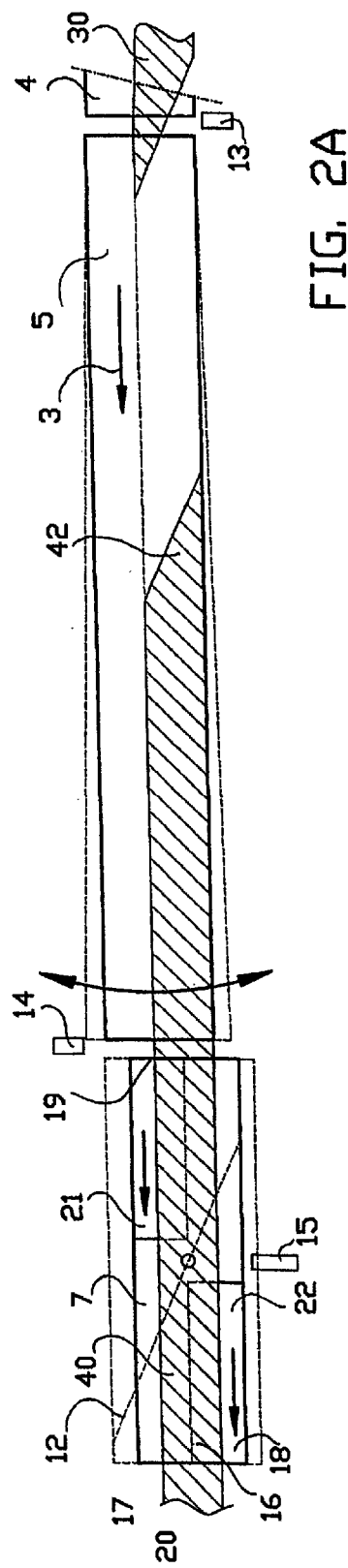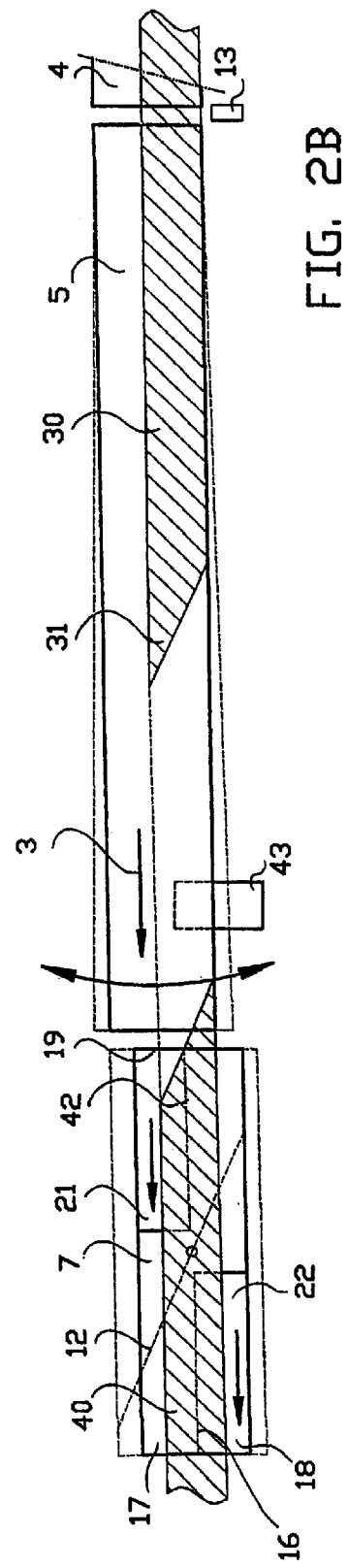

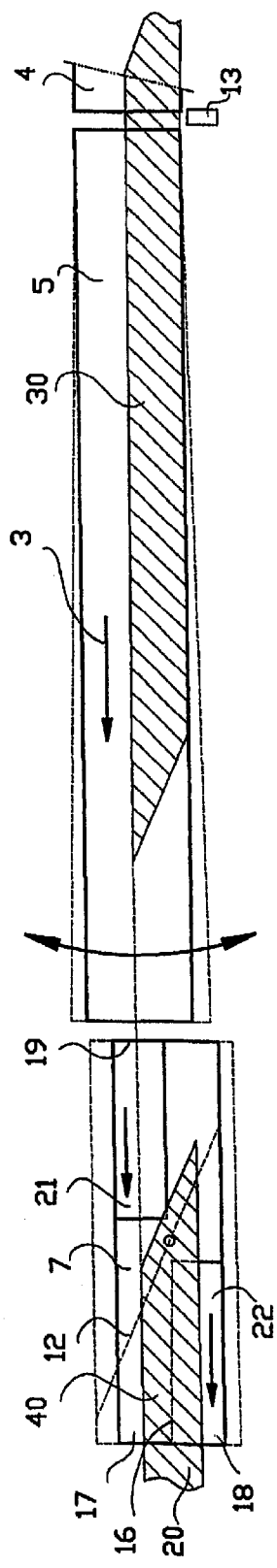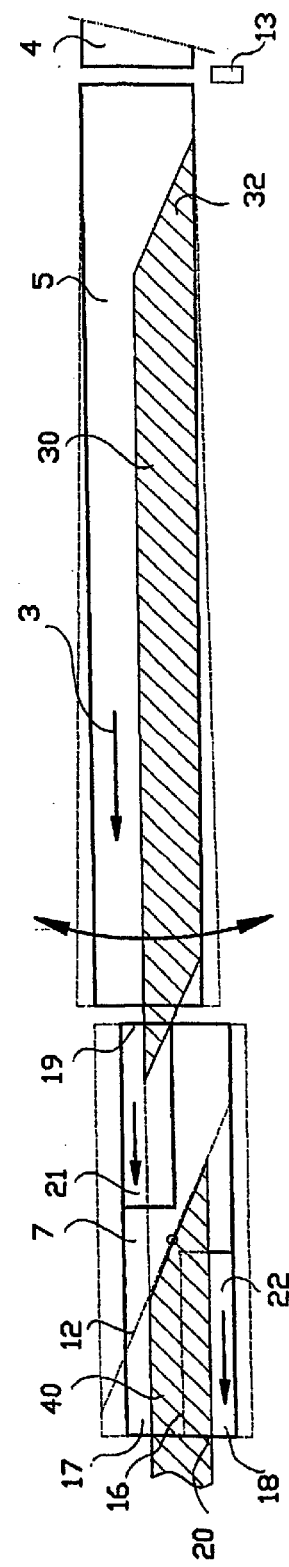

SPLICER FOR SPLICING STRIPS OF CORDS EMBEDDED IN RUBBER MATERIAL TO EACH OTHER

Figure 1:
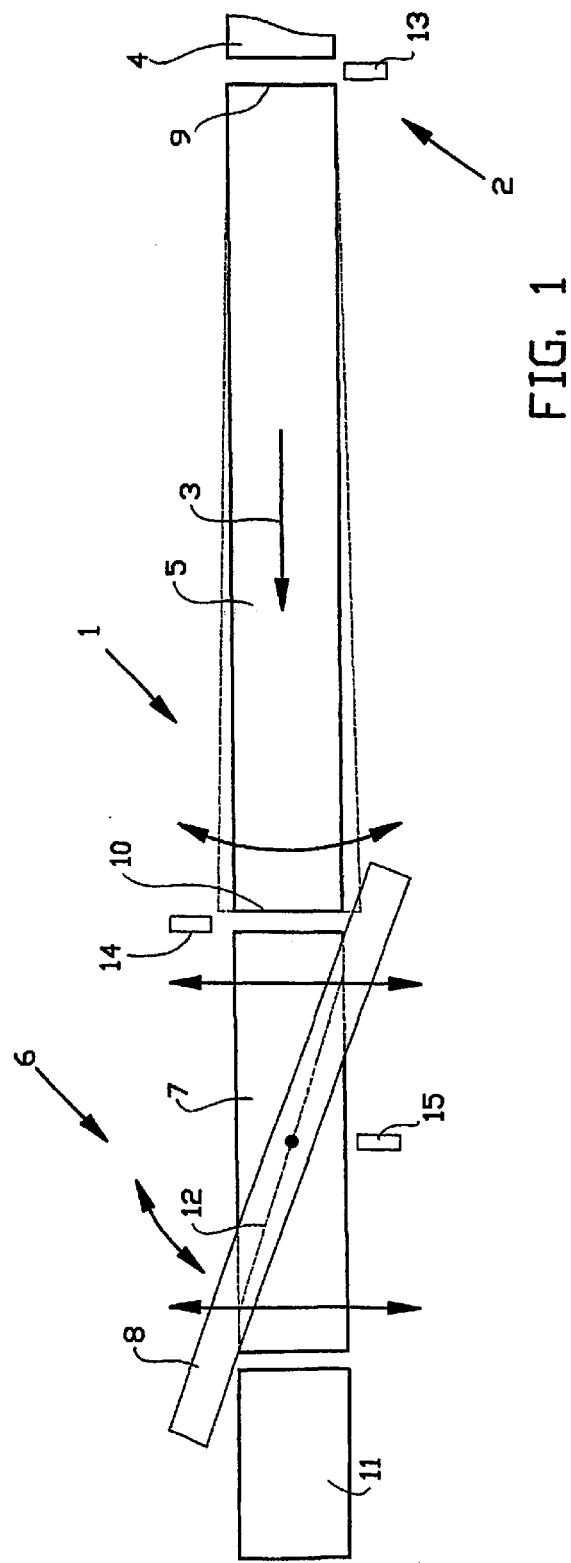

This application is a continuation of PCT/NL01/00385, filed May 21, 2001.

The present invention relates to a splicer for splicing strips of cords embedded in rubber material to each other, which device is provided with a supply transport device for supplying the strips in a supply direction, with a splicing unit for splicing the strips to each other, which splicing unit comprises a splicing table and a splicing machine placed over the splicing table, in which the supply transport device supplies the strips to the splicing unit, and with a discharge transport unit for discharging the strips spliced to each other. The cords embedded in the rubber material may for instance be of steel or the like.

Such splicers are known and have been used for quite a number of years. In said known devices the strips are supplied to the splicing table and are slid over the splicing table until at the splicing position.

For instance, a device is known from U.S. Pat. No. 4,832,780 for connecting strips of cords embedded in rubber material to each other. This device has a supply transport device for supplying the strips to a splicing table. A positioning device over the splicing table positions the strip. The problem here is that the strip may deform during the positioning.

Another device is known from U.S. Pat. No. 3,935,056 for splicing strips of cords embedded in rubber material to each other. Here the strips are supplied to a splicing table divided into halves. The angle of the halves with respect to each other can be adjusted, albeit limited to large angles.

Yet there is a need in the art for a splicer with which the productivity as well as the quality of the strips spliced together is improved.

To that end a splicer of the kind described above according to the invention is characterized in that the supply transport device is provided with a first transport unit and a second transport unit that are in line with each other, in which the first transport unit supplies strips to the second transport unit, in which the second transport unit supplies strips to the splicing unit and has an inlet end and an outlet end, and that the outlet end of the second transport unit and the splicing table are laterally, that means transverse to the transport direction, movable with respect to each other. Indeed because the splicing table and the second transport unit are laterally moveable with respect to each other, can the strip on a laterally adjustable position be supplied to the splicing table.

In a preferred embodiment of a splicer according to the invention the second transport unit is laterally movable in its entirety. Alternatively the second transport unit can be rotatably mounted around its inlet end. Additionally or alternatively the splicing table can be laterally movable in its entirety.

Especially with narrow and/or limp strips the sliding of strips over the splicing table results in inaccurate positioning because of which the splicing together of two strips takes place unreproducibly and insufficiently accurate. Generally the strips have a triangular leading and a triangular trailing tip, and particularly a sharp tip can be pointed upwards unwantedly during the sliding. The known splicers try to limit this effect as much as possible by selecting the point of rotation of the splicing unit, that forms a splice line, at the side of the obtuse angle of the tip. As a result deviations occur at one side of the strips spliced together, which may lead to an unacceptably large deviation. In an embodiment of the splicer according to the invention this is solved because the splicing machine is rotatably mounted, and that the point of rotation is formed by the middle of the splice line. In this way possible deviations are distributed over both sides of the strips and the resulting (halved) deviation may be acceptable indeed.

In order to reduce inaccuracies in the positioning as a result of the sliding of the strips over the splicing table, in an embodiment of a splicer according to the invention the splicing table is provided with a longitudinal axial line dividing the splicing table in a first splicing table half and a second splicing table half, an inlet end, an outlet end, a first splicing table transport unit placed on the first splicing table half, which first splicing table transport unit extends from the inlet end of the splicing table up to a distance from the inlet end of the splicing table, and preferably a second splicing table transport unit placed on the second splicing table half, which second splicing table transport unit extends from the outlet end of the splicing table. As a result half of the supplied strip can be placed on the first splicing table transport unit and for instance by synchronised drive with the second transport unit the strip can be supplied in position on the splicing table without loss of accuracy. Together with the discharge transport device the second splicing table transport unit ensures the discharge of two strips that have been spliced to each other.

In order to transport the strip to a predetermined position on the splicing table it is advantageous that a first sensor is provided for determining the centre of the strip between the first transport unit and the second transport unit and for generating a starting position signal. In this way a strip can be positioned at a very early stage, which increases the accuracy of the splice.

Preferably a second sensor determines the position of the strip between the second transport unit and the splicing table and it also generates a middle position signal, and a third sensor determines the position of the strip under the splice line and it generates an end position signal. As a result last-minute position alterations can be made.

Preferably a computer is provided having a file in which a target position has been included, and a comparer for comparing a position signal generated by one of the sensors and fed into the computer, with the target position and for issuing a control signal for controlling the relative lateral position of the splicing table and/or the second transport unit. In a computer controlled manner the position of the splicing table and/or the second transport unit can thus be set. With the help of the obtained computer data the conveyor belts can be controlled as well. The computer control and sensors form means for controlling the corrections. The corrections are carried out during the supply of the strips, as a result of which a splicer can be obtained having a swift processing of strips.

A very accurate splice is obtained when the target position is the middle of the splice line.

The accuracy of the splice is further improved when the first and second splicing table transport unit and the second transport unit decelerate in a synchronized manner to a speed zero, so that splicing the strips to each other takes place with motionless strips.

In an embodiment the first and second transport units are of a type supporting the strips over almost their entire length. As a result the transport is monitored. To realise a better monitoring of the movement in an embodiment, the transport units are provided with means for retaining the strips on the surface of the transport units. Said means may for instance be suitable for generating magnetic fields or vacuum between the strips and the surface of the transport units. Because of this the supply takes place in a controlled manner. In this embodiment it is preferred when the means for retaining the strips can be switched on and off.

Some exemplary embodiments of a splicer according to the present invention will by way of example be described on the basis the drawings.

FIG. 1 schematically shows a first embodiment of a splicer according to the invention, and FIGS. 2A, B, C, D schematically show a second embodiment of a splicer according to the invention.

FIG. 1 schematically shows a top view of a first embodiment of a splicer 1 for splicing strips of in rubber material embedded cords to each other according to the invention. The in the rubber material embedded cords may for instance be of steel or the like. Such cords reinforce the strips.

The splicer 1 comprises a supply transport device 2 for supplying strips in a supply direction 3. According to the invention the supply transport device 2 comprises a first transport unit 4 and a second transport unit 5 that are in line with each other. The second transport unit 5 has an inlet end 9 and an outlet end 10.

Furthermore the splicer 1 comprises a splicing unit 6 for splicing strips to each other. The splicing unit 6 comprises a splicing table 7 and a splicing machine 8 placed over the splicing table 7. A splice line 12 is determined by the splicing machine 8.

During operation of the splicer 1 the first transport unit 4 supplies strips to the second transport unit 5. The second transport unit 5 subsequently transports the strips further to the splicing table 7 of the splicing unit 6.

According to the invention the position of a strip to be supplied to the splicing table 7 can be adjusted to the position of a strip that is already present on the splicing table 7, so that these two strips can be spliced to each other more accurately, because the outlet end 10 of the second transport unit 5 and the splicing table 7 are laterally, that means transverse to the transport direction, movable with respect to each other.

When the two strip have been spliced to each other, they are discharged by means of a discharge transport device 11 for discharging strips spliced together.

For laterally moving the outlet end 10 of the second transport unit 5 and the splicing table 7 with respect to each other, different alternatives are possible. For instance the second transport unit 5 can be laterally movable in its entirety. Additionally the second transport unit can be rotatably mounted around its inlet end 9. Additionally or alternatively the splicing table 7 can be laterally movable in its entirety.

In order to transport the strip to a predetermined position on the splicing table 7, according to the invention a first sensor 13 is provided for determining the centre of the strip between the first transport unit 4 and the second transport unit 5. Said sensor 13 generates a starting position signal. In this way a strip can already be positioned at a very early stage, which increases the accuracy of the final splice.

Preferably a second sensor 14 determines the position of the strip between the second transport unit 5 and the splicing table 7. Said second sensor 14 also generates a middle position signal. A third sensor 15 determines the position of the strip under the splice line 12 and also generates an end position signal. As a result last-minute position alterations can be made, as will be explained below, Preferably a computer is provided (not shown) having a file in which a target position has been included, and a comparer for comparing a position signal generated by one of the sensors and fed into the computer, with the target position and for issuing a control signal for controlling the relative lateral position of the splicing table 7 and/or the second transport unit 5, as will be elucidated below. In a computer controlled manner the position of the splicing table 7 and/or the second transport unit 5 can thus be set.

A very accurate splice can be obtained when the target position is the centre of the splice line 12. Especially in case of narrow and/or limp strips it is extra advantageous when the splicing machine 8 is rotatably mounted, and the point of rotation is formed by the middle of the splice line 12. As discussed above, in this way possible deviations are distributed over both sides of the strips and the resulting (halved) deviations are acceptable indeed.

The invention also offers the possibility to reduce inaccuracies in the positioning as a result of sliding the strips over the splicing table 7, as shown in FIG. 2. The splicing table 7 has an imaginary longitudinal centre line 16 dividing the splicing table 7 in a first splicing table half 17 and a second splicing table half 18. The splicing table 7 further has an inlet end 19 and an outlet end 20. A first splicing table transport unit 21 is placed on the first splicing table half 17, and extends from the inlet end 19 of the splicing table 7 up to a distance from the inlet end 19 of the splicing table 7. Because of this, half of a supplied strip can be placed on the first splicing table transport unit 21, and for instance by synchronised drive with the second transport unit 5 the strip can be supplied in position on the splicing table 7 without loss of accuracy.

When after two strips have been spliced together they have to be discharged from the table, it is additionally advantageous when a second splicing table transport unit 22 has been placed on the second splicing table half 18, and extends from the outlet end 20 of the splicing table 7 up to a distance therefrom.

The above-mentioned transport units and the like are for instance formed by conveyor belts, possibly provided with means for generating a vacuum or a magnetic field for transporting the strips slip-free.

The conveyor belts 4, 5, 21 and 22 can be controlled as well by means of the computer and the data obtained by the sensors 13, 14 and 15.

The operation of the splicer according to the invention will be elucidated below on the basis of the FIGS. 2A–2D.

During supplying a strip 30 to the splicing table 7, the strip 30 is laterally actively directed towards the target position on the splice line 12. To that end the position of the strip 30 is measured beforehand by the sensor 13 at the location where the strip 30 is transferred on the second transport unit 5, also called centring conveyor. This offers the opportunity to direct the leading tip 31 (FIG. 2B) to the lateral target position during transport of the strip 30 to the splicing table 7. In the same way the lateral position of the rear side of the strip 30 is also measured during transfer to the centering conveyor 5, and directed towards the target position during transport.

The stop position of the strip 30 on the splicing table 7 is controlled by the sensors 14 and 15 (for clarity's sake only shown in FIG. 2A), on the basis of which data the drive of the conveyor belt 4 and the discharge transport device for discharging the strips spliced together is regulated.

In order to discharge the strips spliced together from the splice line 12 while monitored and to supply a supplied strip 30 from the splice line 12 while monitored, splicing table transport units 21 and 22 are provided.

During supply the splicing table transport unit 21 preferably moves synchronously with centring conveyor 5, and half of the strip 30, as seen in transverse direction, is retained by the splicing table transport unit 21. The other half of the strip to be supplied slides over the splicing table 7.

After splicing the strip 30 to a strip 40 already supplied to the splicing table 7, the strips 30, 40, spliced together, are passed on by driving all transport units 5, 21 and 22, whereas positioning the end tip of the discharged strip 30 takes place by means of the transport unit 22.

Although it is shown in the figures that the splicing table transport units 21 and 22 only partially extend over the splicing table 7, it is also possible alternatively that they extend over the entire length of the splicing table 7. The operation in principle remains the same, on the understanding that the first half of the splicing table transport unit 21 needs to have sufficient clamping force to supply the material slip-free, whereas the second half has to be able to run under the already passed strip 40, without the strip position being changed. To that end means for generating a vacuum of magnetic field for retaining the strip may be provided in the first part, and a so-called air-floatation system may be provided in the second part. With regard to the splicing table transport unit 22 the placing of the means for generating a vacuum or magnetic field and the air-floatation system is the other way round.

In FIG. 2A a previous splice has already been made between strips, and the passing on of the strip starts at high speed by means of conveyor belts 4, 5, 21 and 22. The position of the leading tip 31 of the strip 30 is measured by the sensor 13. As a result the centre line of the strip 30 can be laid on the middle position of the splice line 12. During passing on, the centre line of the end 42 of the strip 40 already spliced together is directed towards the middle of the splice line 12 by means of a movement device 43 connected to the centring conveyor 5 (for clarity's sake only shown in FIG. 2B). This treatment is finished when the end 42 leaves the centring conveyor 5. Said end 42 is perceived by the sensor 14.

In the situation shown in FIG. 2B the deceleration of the strip 40 towards the splice line 12 starts by means of the splicing table transport units 21 and 22. Moreover the centring conveyor 5 is used to position the centre line of the arriving tip 31 laterally, whereas said conveyor 5 still works at high speed. As a result the tip 31 is directed exactly in the direction towards the middle of the splicing table 7, even before the tip 31 has reached the splicing table 7.

In FIG. 2C the situation is shown in which by means of the sensor 15 the position of the strip 40 is determined again. The splice table transport units 21 and 22 still work synchronously, but decelerate to a speed zero. The conveyor 5 decelerates to speed zero as well. Because of the low speed the measuring accuracy of the position of the end 42 with respect to the splice line 12 is large as well, and the passed on end 42 can be positioned exactly towards the splicing position. The moment in which the sensor 15 no longer detects material is also the moment in which the speed of the splicing table transport unit 21 is adjusted to the one of the centring conveyor 5.

In FIG. 2D the situation is described in which the supplied strip 30 is detected by the sensor 14. The splicing table transport units 21 and 22 decelerate synchronously to position the strip 30 towards the stop position. When material is detected by the sensor 15 during the deceleration, the positioning may be adjusted. Meanwhile the lateral position of the trailing end 32 (see FIG. 2D) has been measured by the sensor 13, and thus its centre line as well can exactly be directed towards the middle of the splicing table 7.

Thus the lateral positioning of both the arriving and the already passed on tips and the ends of the strips, respectively, is carried out during transport over the centring conveyor 5, which is not detrimental to the cycle time of the splicing unit. Moreover, both the lateral and the length position of the strips to be spliced are controlled up to the splice line by the splicing table transport units 21 and 22, independent of the angle or width of the material.

What is claimed is:

1. A splicer for splicing strips of code embedded in rubber material to each other, which splicer is provided with:
    a supply transport device for supplying strips in a supply direction,
    a splicing unit for splicing strips to each other, which splicing unit comprises a splicing table and a splicing machine placed over the splicing table, in which the supply transport device supplies strips to the splicing unit, and
    a discharge transport device for discharging strips spliced to each other, wherein the supply transport device is provided with a first transport unit and a second transport unit that are in line with each other, in which the first transport unit supplies strips to the second transport unit, in which the second transport unit supplies strips to the splicing unit and has an inlet end and an outlet end, and that the outlet end of the second transport unit and the splicing table are laterally movable with respect to each other, and the outlet end of the second transport unit is movable transverse to the supply direction.

2. The splicer according to claim 1, wherein the second transport unit in its entirety is laterally movable.

3. The splicer according to claim 2, wherein the splicing table in its entirety is laterally movable.

4. The splicer according claim 3, wherein the splicing machine is rotatably mounted and determines a splice line, and that the point of rotation is formed by the middle of the splice line.

5. The splicer according claim 4, wherein the splicing machine is rotatably mounted and determines a splice line, and that the point of rotation is formed by the middle of the splice line.

6. The splicer according to claim 5, wherein the splicing table is provided with a longitudinal axial line dividing the splicing table in a first splicing table half and a second splicing table half, an inlet end, an outlet end, and a first splicing table transport unit placed on the first splicing table half, which first splicing table transport unit extends from the inlet end of the splicing table up to a distance from the inlet end of the splicing table, and preferably a second splicing table transport unit placed on the second splicing table half, which second splicing table transport unit extends from the outlet end of the splicing table.

7. The splicer according to claim 2, wherein the splicing machine is rotatably mounted and determines a splice line, and that the point of rotation is formed by the middle of the splice line.

8. The splicer according to claim 7, wherein the splicing table is provided with a longitudinal axial line dividing the splicing table in a first splicing table half and a second splicing table half, an inlet end, an outlet end, and a first splicing table transport unit placed on the first splicing table half, which first splicing table transport unit extends from the inlet end of the splicing table up to a distance from the inlet end of the splicing table, and preferably a second splicing table transport unit placed on the second splicing table half, which second splicing table transport unit extends from the outlet end of the splicing table.

9. The spicer according to claim 8, wherein the splicing machine determines a splice line, and in that a first sensor is provided for determining the centre of the strip between the first transport unit and the second transport unit and for generating a starting position signal.

10. The splicer according to claim 9, wherein a second sensor determines the position of the strip between the second transport unit and the splicing table and generates a middle position signal, and a third sensor determines the position of the strip under the splice line and generates an end position signal.

11. The splicer according to claim 10, wherein a computer is provided having a file including a target position, and a comparer for comparing a position signal generated by one of the sensors and fed into the computer with the target position and for issuing a control signal for controlling the relative lateral position of the splicing table and the second transport unit.

12. The splicer according to claim 11, wherein the target position is the middle of the splice line.

13. The splicer according to claim 8, wherein the first and second splicing table transport unit and the second transport unit decelerate in a synchronized manner to a zero speed so that splicing the strips to each other takes place with motionless strips.

14. The splicer according to claim 1, furthermore comprising a first sensor for providing position signals of the supplied strips and a computer having a file which includes a target position of a strip and a comparer for compar-ing a position signal provided by the first sensor to the computer with the target position of the strip and for issuing a control signal for controlling the relative lateral position of the splicing table with respect to the outlet end of the second transport unit during the supply of the strips.

15. The splicer of claim 1, wherein the outlet end of the second transport unit is laterally movable with respect to the splicing table during the supplying of the strips.

16. A splicer for splicing strips of in rubber material embedded cords to each other, which splicer is provided with:

a supply transport device for supplying strips in a supply direction, said strips having a leading edge, a trailing edge and lateral edges, a splicing unit for splicing strips to each other, which splicing unit comprises a splicing table and a splicing machine placed over the splicing table for splicing the trailing edge of a leading strip to a leading edge of a trailing strip, in which the supply transport device supplies strips to the splicing unit in the supply direction, and a discharge transport device for discharging strips spliced to each other, wherein the supply transport device is provided with a first transport unit and a second transport unit that are in line with each other and supply the strips in the supply direction, the first transport unit supplies the strips to the second transport unit, the second transport unit supplies the strips to the splicing unit and has an inlet end and an outlet end, and that the outlet end of the second transport unit and the splicing table are laterally movable with respect to each other.

17. The splicer according to claim 16, wherein the splicing table in its entirety is laterally movable.

18. The splicer according claim 17, wherein the splicing machine is rotatably mounted and determines a splice line, and that the point of rotation is formed by the middle of the splice line 19. The splicer according claim 16, wherein the splicing machine is rotatably mounted and determines a splice line, and that the point of rotation is formed by the middle of the splice line.

20. The splicer according to claim 16, wherein the splicing table is provided with a longitudinal axial line dividing the splicing table in a first splicing table half and a second splicing table half, an inlet end, an outlet end, and a first splicing table transport unit placed on the first splicing table half, which first splicing table transport unit extends from the inlet end of the splicing table up to a distance from the inlet end of the splicing table, and preferably a second splicing table transport unit placed on the second splicing table half, which second splicing table transport unit extends from the outlet end of the splicing table.

21. The splicer according to claim 16, wherein a computer is provided having a file including a target position, and a comparer for comparing a position signal generated by the sensor and fed into the computer with the target position and for issuing a control signal for controlling the relative lateral position of the splicing table and the second transport unit.

22. The splicer of claim 16, wherein the outlet end of the second transport unit and the splicing table are laterally movable with respect to each other during the supply of the strips.

* * * * *

UNITED STATES PATENT AND TRADEMARK OFFICE
CERTIFICATE OF CORRECTION

PATENT NO. : 6,796,354 B2
DATED : September 28, 2004
INVENTOR(S) : Klaas Nauta et al.

It is certified that error appears in the above-identified patent and that said Letters Patent is hereby corrected as shown below:

Title page,
Insert Item:
-- [30]   Foreign Application Priority Data
   May 19, 2000        (NL) ....... 1015250 --.

Column 1,
Line 6, after "2001" insert -- , which designated the U.S., claims the benefit thereof and incorporates the same by reference --.

Signed and Sealed this

Sixteenth Day of November, 2004

JON W. DUDAS
*Director of the United States Patent and Trademark Office*